(12) United States Patent
Yamada

(10) Patent No.: US 11,240,395 B2
(45) Date of Patent: Feb. 1, 2022

(54) INFORMATION-PROCESSING DEVICE IMPORTING SETTING INFORMATION THEREINTO AND METHOD FOR IMPORTING SETTING INFORMATION INTO INFORMATION-PROCESSING DEVICE

(71) Applicant: BROTHER KOGYO KABUSHIKI KAISHA, Nagoya (JP)

(72) Inventor: Takatsugu Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/813,816

(22) Filed: Mar. 10, 2020

(65) Prior Publication Data

US 2020/0296227 A1 Sep. 17, 2020

(30) Foreign Application Priority Data

Mar. 14, 2019 (JP) .............................. JP2019-047432

(51) Int. Cl.
*H04N 1/00* (2006.01)
*H04L 9/32* (2006.01)
(Continued)

(52) U.S. Cl.
CPC ....... *H04N 1/0097* (2013.01); *G06F 13/1668* (2013.01); *G06F 13/4282* (2013.01);
(Continued)

(58) Field of Classification Search
None
See application file for complete search history.

(56) References Cited

U.S. PATENT DOCUMENTS

| 2009/0067633 A1* | 3/2009 | Dawson | H04L 9/0822 380/279 |
| 2009/0147298 A1* | 6/2009 | Takahashi | H04N 1/6033 358/1.15 |
| 2018/0351742 A1* | 12/2018 | Yamazaki | H04L 9/0861 |

FOREIGN PATENT DOCUMENTS

| JP | 2007-313795 A | 12/2007 |
| JP | 4622926 B2 | 2/2011 |
| JP | 2012-222645 A | 11/2012 |

* cited by examiner

*Primary Examiner* — Frantz Bataille
(74) *Attorney, Agent, or Firm* — Scully, Scott, Murphy & Presser, PC

(57) ABSTRACT

In an information-processing device, a memory is configured to store setting information including an operation setting for the information-processing device. A controller is configured to perform: acquiring; determining; allowing; importing; and encrypting. The acquiring acquires import authentication information including a device password for the information-processing device while a removable storage medium storing import setting information is connected to an input-output interface. The determining determines whether the device password matches a preset device password of the information-processing device. The allowing allows, in response to determining that the device password matches the preset device password, the import setting information to be imported. The importing imports the import setting information from the removable storage medium into the memory as the setting information. The encrypting encrypts the import authentication information using the device password to create encrypted import authentication information and stores the encrypted import authentication information into the removable storage medium.

15 Claims, 11 Drawing Sheets

(51) Int. Cl.
*G06F 21/60* (2013.01)
*G06F 13/16* (2006.01)
*H04N 1/44* (2006.01)
*G06F 13/42* (2006.01)

(52) U.S. Cl.
CPC .......... *G06F 21/608* (2013.01); *H04L 9/3226* (2013.01); *H04N 1/00965* (2013.01); *H04N 1/4413* (2013.01); *G06F 2213/0042* (2013.01); *H04N 2201/0094* (2013.01)

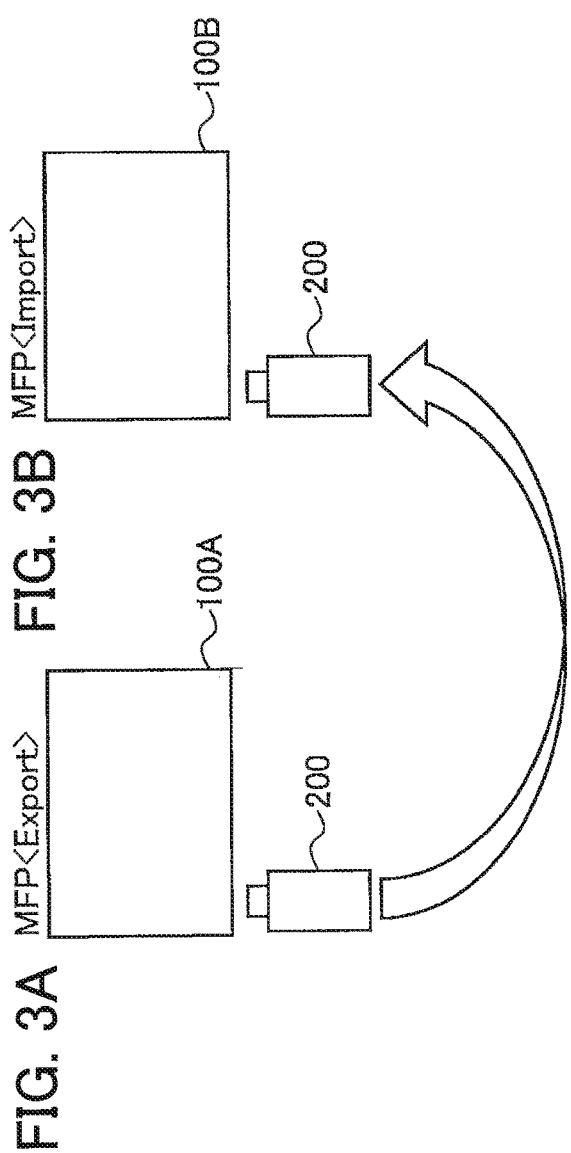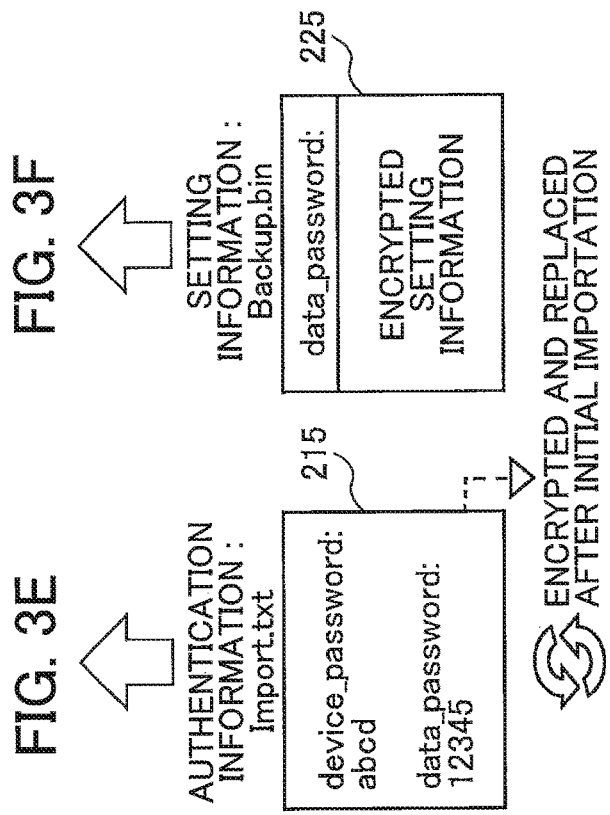

FIG. 4

SETTING INFORMATION (data.json)

220

INSTALLATION SITE: Team1
CONTACT ADDRESS: team1@mail.co.jp

IP Address: 123.456.123.456
MailServer: 123.123.123.456

SCAN SETTINGS
  DISPLAY NAME: ScanToMike
  DESTINATION INFORMATION: 123.123.123.123
  SCANNING RESOLUTION: 300dpi
  DUPLEX SCAN: ON
  COLOR: ON COPY SETTINGS
  DISPLAY NAME: Copy1
  SCANNING RESOLUTION: 200dpi
  DUPLEX SCAN: ON
  COLOR: ON
  DUPLEX PRINT: ON

INFORMATION-PROCESSING DEVICE IMPORTING SETTING INFORMATION THEREINTO AND METHOD FOR IMPORTING SETTING INFORMATION INTO INFORMATION-PROCESSING DEVICE

CROSS REFERENCE TO RELATED APPLICATION

This application claims priority from Japanese Patent Application No. 2019-047432 filed Mar. 14, 2019. The entire content of the priority application is incorporated herein by reference.

TECHNICAL FIELD

The present disclosure relates to a technology for configuring setting information on an information-processing device.

BACKGROUND

A conventional image-forming device known in the art reads device setting information stored in an external storage medium and uses this setting information to configure its own setting information in accordance with instructions in a command information file (see Japanese Patent Application Publication No. 2007-276362).

SUMMARY

However, the conventional image-forming device described above does not encrypt the command information file after configuring its own setting information. Consequently, the information may not be sufficiently protected.

In view of the foregoing, it is an object of the present disclosure to provide a technology for better protecting information in a command information file.

In order to attain the above and other objects, the present disclosure provides an information-processing device including: a memory; an input-output interface; and a controller. The memory is configured to store setting information including an operation setting for the information-processing device. The controller is configured to perform: (a) acquiring; (b) determining; (c) allowing; (d) importing; and (e) encrypting. The (a) acquiring acquires import authentication information including a device password for the information-processing device while a removable storage medium storing import setting information is connected to the input-output interface. The (b) determining determines whether the device password matches a preset device password of the information-processing device. The (c) allowing allows, in response to determining that the device password matches the preset device password, the import setting information to be imported. The (d) importing imports the import setting information from the removable storage medium into the memory as the setting information. The (e) encrypting encrypts the import authentication information using the device password to create encrypted import authentication information and stores the encrypted import authentication information into the removable storage medium.

According to another aspect, the present disclosure also provides an information-processing device including: a memory; an input-output interface; and a controller. The memory is configured to store setting information. The controller is operable according to the setting information. The controller is configured to perform: (a) receiving; (b) determining; (c) acquiring; (d) storing; (e) encrypting; and (f) storing. The (a) receiving receives authentication information while a removable storage medium storing import setting information is connected to the input-output interface. The (b) determining determines whether authentication using the authentication information is successful. The (c) acquiring acquires, in response to determining that the authentication is successful, the import setting information from the removable storage medium via the input-output interface. The (d) storing stores the setting information based on the import setting information in the memory. The (e) encrypting encrypts the authentication information. The (f) storing stores the encrypted authentication information in the removable storage medium via the input-output interface.

According to still another aspect, the present disclosure also provides a method for importing setting information into an information-processing device. The setting information includes an operation setting for the information-processing device. The information-processing device includes an input-output interface. The method includes: (a) acquiring; (b) determining; (c) allowing; (d) importing; and (e) encrypting. The (a) acquiring acquires import authentication information including a device password for the information-processing device while a removable storage medium storing import setting information is connected to the input-output interface. The (b) determining determines whether the device password matches a preset device password of the information-processing device. The (c) allowing allows, in response to determining that the device password matches the preset device password, the import setting information to be imported. The (d) importing imports the import setting information from the removable storage medium into the memory as the setting information. The (e) encrypting encrypts the import authentication information using the device password to create encrypted import authentication information and storing the encrypted import authentication information into the removable storage medium.

BRIEF DESCRIPTION OF THE DRAWINGS

The particular features and advantages of the disclosure as well as other objects will become apparent from the following description taken in connection with the accompanying drawings, in which:

FIGS. 3A through 3F illustrate how setting information is exported from one multifunction peripheral and imported into another multifunction peripheral;

FIG. 4 illustrates an example of setting information for importation to be imported into another multifunction peripheral;

DETAILED DESCRIPTION

Figure 1:
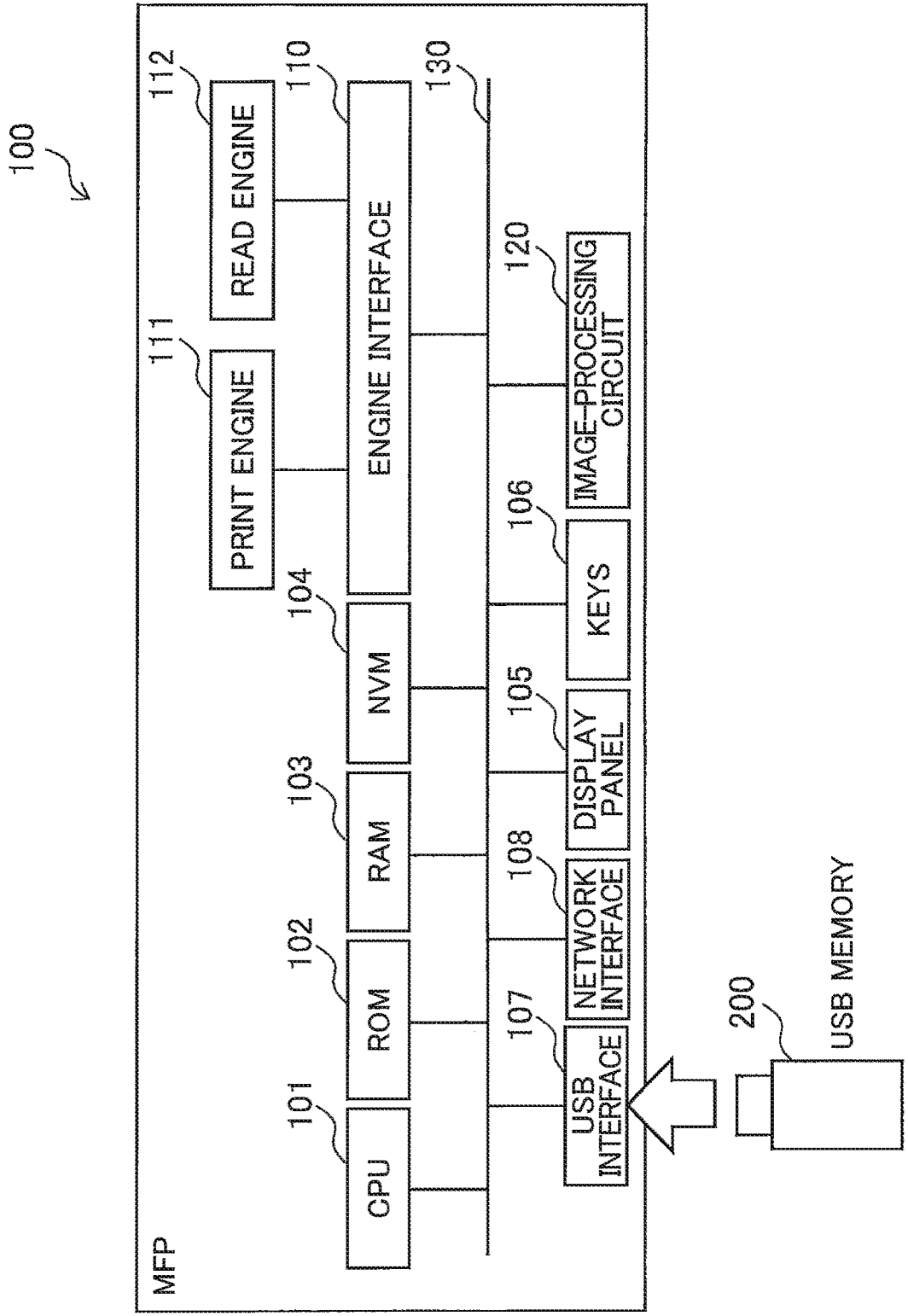
FIG. 1 is a block diagram illustrating the control structure of a multifunction peripheral according to an embodiment that applies an information-processing device of the present disclosure.

An information-processing device according to one embodiment will be described while referring to the accompanying drawings wherein like parts and components are designated by the same reference numerals to avoid duplicating description.

FIG. 1 is a block diagram illustrating the control structure of a multifunction peripheral 100 according to the embodiment that applies the information-processing device of the present disclosure. Hereinafter, the multifunction peripheral 100 will be abbreviated as MFP 100.

As illustrated in FIG. 1, the MFP 100 is provided with a central processing unit (CPU) 101, a read-only memory (ROM) 102, a random-access memory (RAM) 103, and a non-volatile memory (NVM) 104.

The CPU 101 handles overall control of the MFP 100. In the present embodiment, the CPU 101 controls a print engine 111 and a read engine 112 according to setting information via an engine interface 110. The setting information, engine interface 110, print engine 111, and read engine 112 will be described later.

The ROM 102 is a memory that stores a control program executed by the CPU 101. The CPU 101 executes various processes after reading the control program stored in the ROM 102.

The RAM 103 is a memory that temporarily stores image data and the like. The CPU 101 also uses the RAM 103 as a storage area for temporarily storing data, signals, and the like used for executing the control program or as a work area for data processing.

The NVM 104 is a non-volatile memory for storing setting information and the like.

Figure 2A:
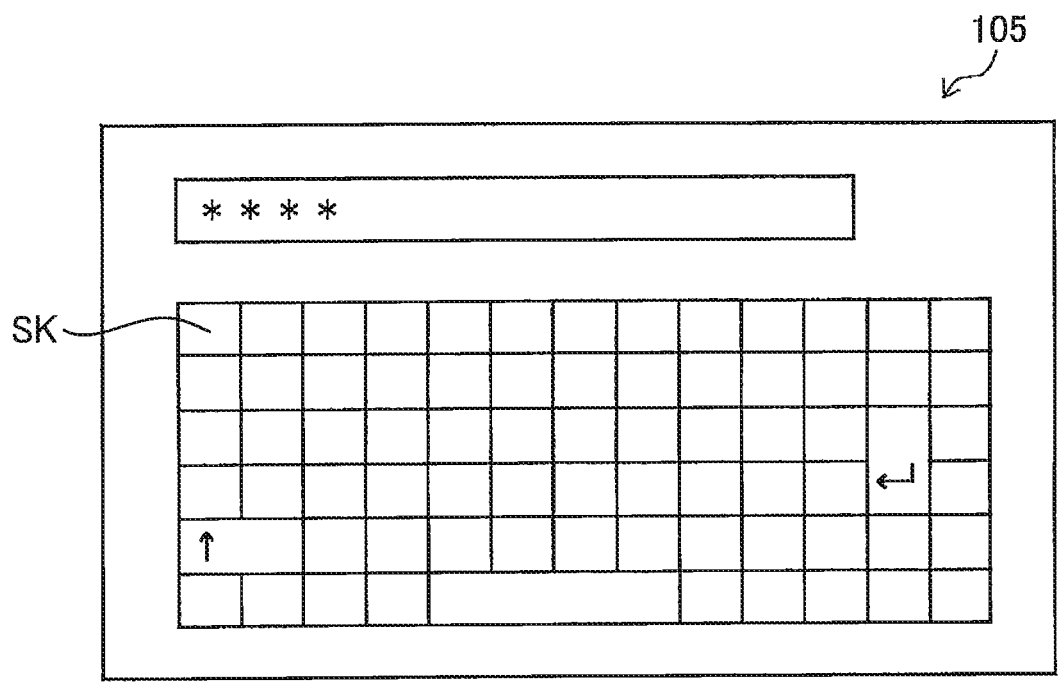
FIGS. 2A and 2B illustrate sample configurations of a display panel and keys included in the multifunction peripheral illustrated in FIG. 1.
Figure 2B:
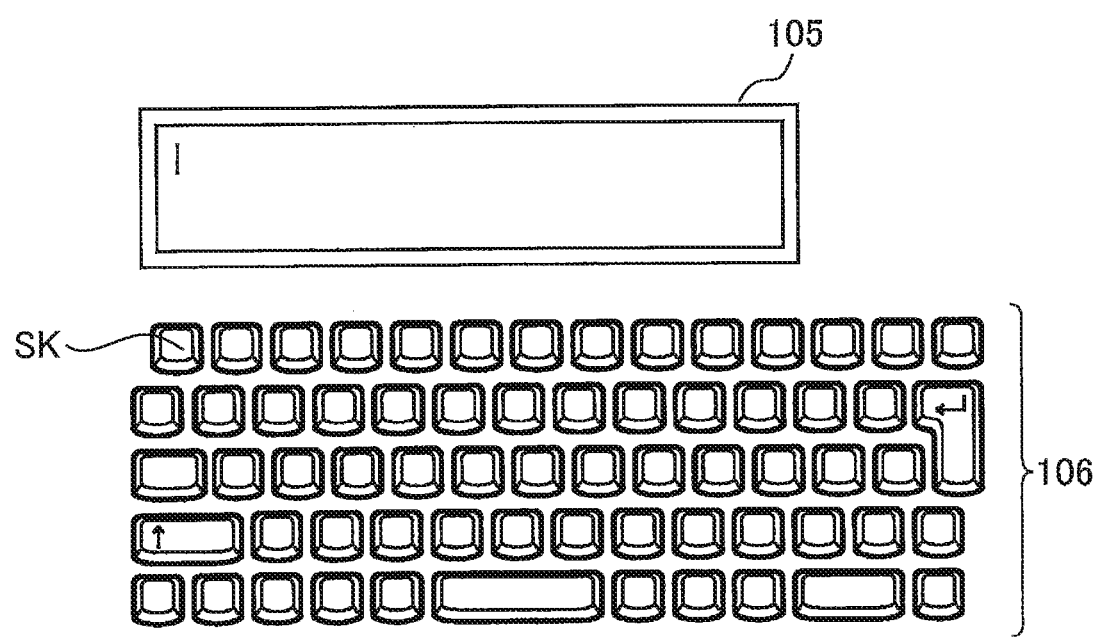

The MFP 100 is further provided with a display panel 105, and keys 106. FIGS. 2A and 2B illustrate sample configurations of the display panel 105 and keys 106.

In the example of FIG. 2A, the display panel 105 is configured of a touchscreen, and most of the keys 106 including a Stop key SK (described later) are configured in a virtual (software) keyboard displayed on the display panel 105. Therefore, only a few of the keys 106 in the example of FIG. 2A are configured in hardware. The hardware keys may include a power switch and a reset switch (both of which are not illustrated in the drawings). Various screens are displayed on the display panel 105 in accordance with the status of the MFP 100. The operator can perform input operations by operating input buttons displayed in the screens. Note that a password typed using the keys 106 will not be displayed on the display panel 105, but rather is masked by asterisks, as illustrated by the "****" displayed in FIG. 2A.

FIG. 2B illustrates an example in which the display panel 105 is configured of a small liquid crystal display panel, and the keys 106 are configured in hardware. In the example of FIG. 2B, characters and simple graphics are displayed on the display panel 105. The display panel 105 and keys 106 are input devices that receive input of information by the operator.

The MFP 100 is further provided with a Universal Serial Bus (USB) interface 107, and a network interface 108.

The USB interface 107 is an input-output (I/O) interface for connecting the MFP 100 to an external USB device. In the present embodiment, a USB memory 200 is connected to the USB interface 107. The USB memory 200 is removable media that is also called a USB flash memory or a USB flash drive.

The network interface 108 functions to connect the MFP 100 to a communication network. The communication network is a wired or wireless local area network (LAN). The network interface 108 may be one or both of a LAN interface or a wireless LAN (WLAN) interface.

The MFP 100 is also provided with the engine interface 110. The print engine 111 and read engine 112 are connected to the engine interface 110.

The print engine 111 functions to print images on sheets and may possess an electrophotographic, inkjet, or thermal type printing device.

The read engine 112 functions to read images from originals and may possess reading devices, such as charge coupled devices (CCDs), a contact image sensor (CIS), or the like.

The engine interface 110 is a control circuit for controlling the print engine 111 and read engine 112. The CPU 101 controls the print engine 111 and read engine 112 through the engine interface 110.

The engine interface 110 is an interface for controlling the print engine 111 and read engine 112.

The MFP 100 is also provided with an image-processing circuit 120.

The image-processing circuit 120 executes a rasterization process on image data for a print job, and outputs the rasterized data to the print engine 111. The image-processing circuit 120 also converts image data read from an original by the read engine 112 to digital data. The converted digital data may then be transmitted externally via the network interface 108 or supplied to the print engine 111 to be outputted onto sheets.

The CPU 101, ROM 102, RAM 103, NVM 104, display panel 105, keys 106, USB interface 107, network interface 108, engine interface 110, and image-processing circuit 120 are all interconnected via a bus 130.

In the present embodiment, setting information stored in the NVM 104 of the MFP 100 can be exported to the USB memory 200 connected to the MFP 100 via the USB interface 107. When the USB memory 200 is subsequently connected to a different MFP, the exported setting information can be imported into the other MFP. Note that all of the MFPs used in the embodiment (an MFP 100A, an MFP 100B, and an MFP 100C described later) have the same configuration as the MFP 100.

Next, a process for exporting setting information from one MFP to another MFP will be described with reference to FIGS. 3A through 3F, FIG. 4, and FIG. 5. The process begins when the operator starts to prepare setting information on one MFP for exportation and is complete when the setting information has been imported into another MFP.

FIGS. 3A through 3F illustrate how setting information is exported from one MFP and imported into another MFP. In the example of FIGS. 3A through 3F, the MFP on the exporting side will be the MFP 100A, and the MFP on the importing side will be the MFP 100B. As described above, the MFP 100A and MFP 100B have the same configuration as the MFP 100, and the reference numerals of the components of the MFP 100A and MFP 100B are suffixed with A and B, respectively.

Figure 5:
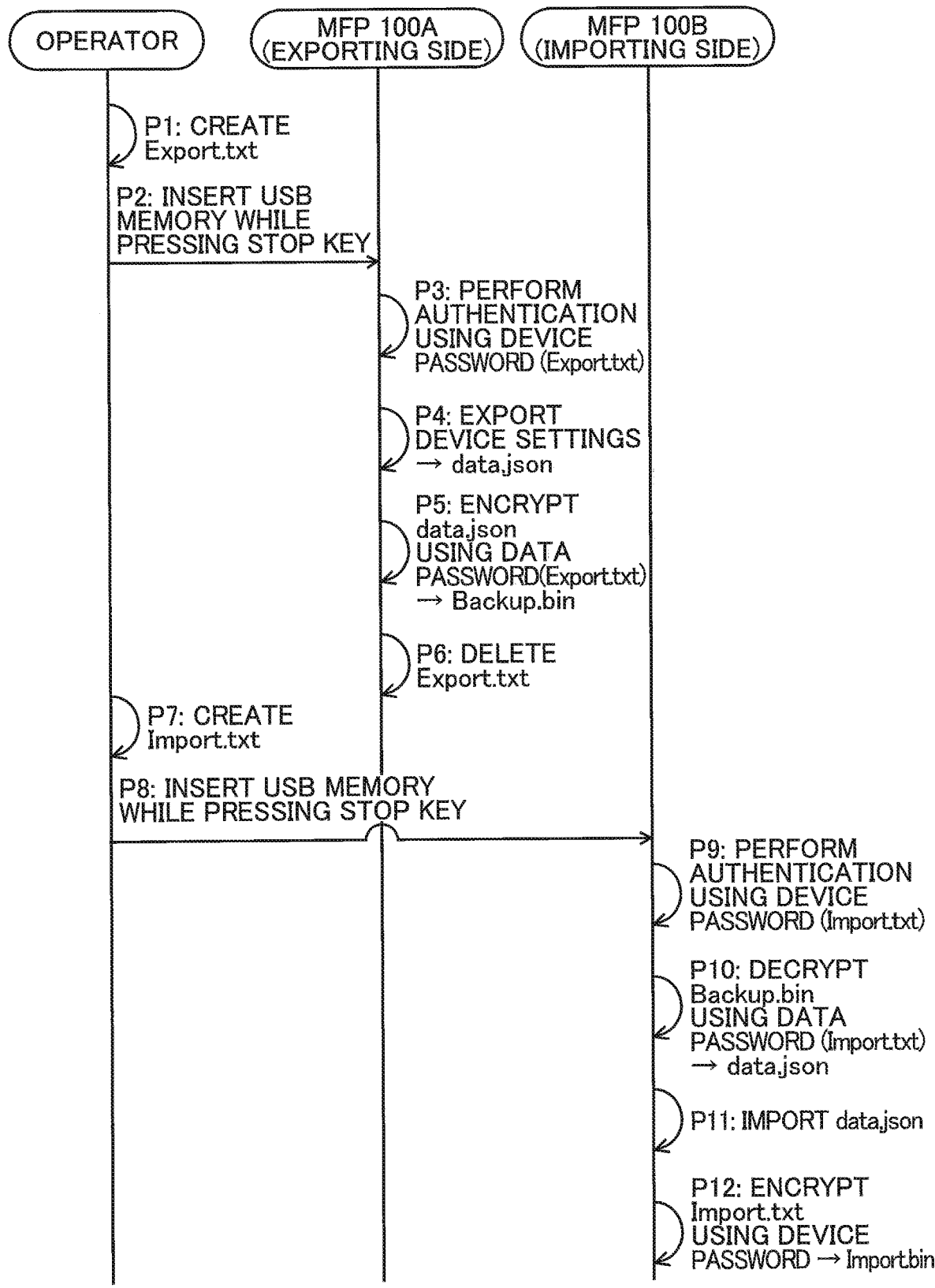
FIG. 5 is a sequence diagram illustrating steps in a process from the start of exportation of setting information on one multifunction peripheral to the completion of importation of the setting information into another multifunction peripheral.

FIG. 5 illustrates the flow of the process from the start of exportation to the completion of importation that includes preparation operations performed by the operator for exporting and importing setting information.

In process 1 (hereinafter "process" in FIG. 5 will be abbreviated to "P", as in "P1") of FIG. 5, the operator creates authentication information 210 for exportation (an Export.txt file). The Export.txt file is a file in the text format. After the operator creates the authentication information 210 for exportation, the authentication information 210 for exportation is stored in the USB memory 200. The authentication information 210 for exportation will be also referred to as the "export authentication information 210."

As illustrated in FIG. 3C, the export authentication information 210 includes a device password, and a data password. The device password is used for logging in to the MFP 100 to which the USB memory 200 is connected. The MFP 100 can export or import setting information once the device password has been authenticated and login is completed. The data password is used for encrypting exported setting information and for decrypting encrypted setting information for importation. In the Export.txt file illustrated in the example of FIG. 3C, the device password is "device_password:abcd" and the data password is "data_password:12345."

In P2 the operator inserts the USB memory 200 into the USB interface 107A of the MFP 100A while pressing a Stop key SK. The Stop key SK is a special key included in the display panel 105 (see FIG. 2A) or keys 106 (see FIG. 2B) of the MFP 100. If the USB memory 200 is connected to the MFP 100 while the Stop key SK is not being pressed, the MFP 100 executes operations in the normal USB memory mode, such as printing print data stored in the USB memory 200 or storing scanned data in the USB memory 200. However, if the USB memory 200 is connected to the MFP 100 while the Stop key SK is being pressed, the MFP 100 executes operations in a batch setting mode for exporting and importing setting information.

In P3 the MFP 100A performs an authentication process based on the device password included in the export authentication information 210. Specifically, in the authentication process, the MFP 100A compares the device password included in the export authentication information 210 to a device password preset in the MFP 100A. The MFP 100A determines that authentication is successful (authentication passed) when the device passwords match, and that authentication is unsuccessful (authentication failed) when the passwords do not match.

If authentication is successful in P3, the MFP 100A allows setting information to be exported thereinto, and in P4 the MFP 100A exports device settings, which is setting information stored in the NVM 104A. Specifically, the MFP 100A reads setting information stored in the NVM 104A. The setting information is developed in the RAM 103A into a data.json file. The data.json file is a file in the JavaScript (registered trademark) Object Notation (JSON) format that stores setting information 220 for importation to be imported into the MFP 100B. The setting information 220 for importation will be also referred to as the "import setting information 220."

FIG. 4 illustrates an example of the import setting information 220. The import setting information 220 illustrated in FIG. 4 constitutes setting information that was stored in the NVM 104A of the MFP 100A and has been exported and developed in the RAM 103A, for example. The import setting information 220 includes at least one of the installation site of the MFP 100A, the contact address for the operator of the MFP 100A, the IP address of the MFP 100A, the IP address of the server or other external device to which the MFP 100A is connected, scan settings, and copy settings. The import setting information 220 is information that an operator can modify when logged in to the MFP 100A.

While the import setting information 220 is developed into the JSON format in the present embodiment, the import setting information 220 may be in a different format, such as the comma-separated values (CSV) format, or as a binary file.

The input setting information 220 in the example of FIG. 4 includes the installation site "Team1" for the MFP 100A, the contact address "team1@mail.co.jp" for the operator of the MFP 100A, the IP address "123.456.123.456" of the MFP 100A, the IP address "123.123.123.456" of the mail server, scan settings, and copy settings.

Scan settings are settings for processes involving the read engine 112A. The scan settings in the example of FIG. 4 include the display name "ScanToMike," the destination information "123.123.123.123," the scanning resolution "300 dpi," the duplex scan setting "ON," and the color setting "ON."

The display name is information for displaying a configuration name on the display panel 105A of the MFP 100A.

The destination information is an address for transmitting image data for a scanned image to a communication network via the network interface 108A. The destination information is not limited to an IP address, used in the example of FIG. 4, but may be a URL or an e-mail address.

The duplex scan setting is an option for scanning images from both surfaces of an original. A duplex scan setting of "ON" indicates that the option is enabled, while a setting of "OFF" indicates that the option is disabled and signifies a setting for scanning an image from only one surface of the original.

The color setting is an option for reading color images from the original. A color setting of "ON" indicates that the option is enabled, while a setting of "OFF" indicates that the option is disabled and signifies a setting to read images from the original in monochrome.

The CPU 101A displays "ScanToMike" on the display panel 105A as the configuration name based on the setting "DISPLAY NAME: ScanToMike." Here, the setting information of FIG. 4 described above that corresponds to "DISPLAY NAME: ScanToMike" indicates setting information for settings that the operator can select from pluralities of settings displayed on the display panel 105A. However, the present disclosure is not limited to this configuration, and the setting information may be for settings that are fixed for an MFP. "Fixed" denotes that the operator is restricted or prohibited from selecting other settings.

The CPU 101A transmits image data read by the read engine 112A to the IP address 123.123.123.123 based on the scan destination information "123.123.123.123." The CPU 101A controls the read engine 112A to read an image at a resolution of 300 dpi based on the scanning resolution "300 dpi." The CPU 101A controls the read engine 112A to read an image at a resolution of 300 dpi based on the scanning resolution "300 dpi." The CPU 101A controls the read engine 112A to read images from both surfaces of the original according to the duplex scan setting "ON." The CPU 101A controls the read engine 112A to read color images from both surfaces of the original according to the color setting "ON."

Copy settings are settings for processes involving the read engine 112A and print engine 111A. In the example of FIG. 4, the copy settings include the display name "Copy1," the scanning resolution "200 dpi," the duplex scan setting "ON," the color setting "ON," and the duplex print setting "ON."

The color setting indicates an option for forming color images on sheets. A setting of "ON" indicates that the option is enabled, while a setting of "OFF" indicates that the option is disabled and signifies a setting for forming monochromatic images on sheets.

The duplex print setting is an option for forming images on both surfaces of a sheet. A setting of "ON" indicates that the option is enabled, while a setting of "OFF" indicates that the option is disabled and signifies a setting for forming images on only one surface of the sheets.

The CPU 101A controls the print engine 111A to form color images on sheets according to the copy setting "COLOR: ON." The CPU 101A controls the print engine 111A to form images on both surfaces of sheets according to the copy setting "DUPLEX PRINT: ON."

Returning to FIG. 5, in P5 the MFP 100A encrypts the import setting information 220 using the data password included in the export authentication information 210 to generate a Backup.bin file. The Backup.bin file encrypted in P5 is stored in the USB memory 200 as encrypted import setting information 225 (see FIG. 3D). Here, the Backup.bin file may be generated by compressing the data.json file according to the ZIP compression format and encrypting the resulting data according to the Advanced Encryption Standard (AES) specifications using the password (data password). Another compression method, such as the LZH format, may be employed in place of ZIP. Further, other encryption specifications, such as the Data Encryption Standard (DES), may be used in place of AES. Alternatively, the Backup.bin file may be generated using only an encryption process while omitting the compression process.

In P6 the MFP 100A deletes the export authentication information 210, i.e., the Export.txt file. After completing this process, the Backup.bin file remains in the USB memory 200.

In addition to the normal definition of "deletion," the "deletion of information or files" in the present embodiment includes the meaning of deletion by overwriting the export authentication information 210 in the USB memory 200 with meaningless information. Here, the meaningless information may be a string of information repeating the same pattern, such as "0000000," or random numbers.

In P7 the operator creates import authentication information 215 (an Import.txt file). The Import.txt file is a file in the text format. The import authentication information 215 created in P7 is stored in the USB memory 200.

As with the export authentication information 210, the import authentication information 215 includes a device password and a data password, as illustrated in FIG. 3E. Since the data password is used for decrypting the Backup.bin file, this password must be the same as the password used when encrypting the Backup.bin file. However, the device password is used for logging in to the MFP to which the USB memory 200 is connected, as described above. Hence, this password need not be the same as the device password included in the export authentication information 210. However, the same password will be used in this embodiment.

In P8 the operator inserts the USB memory 200 into the USB interface 107B of the MFP 100B while pressing the Stop key SK. The Stop key SK is a special key included in the keys 106B of the MFP 100B.

In P9 the MFP 100B performs an authentication process using the device password included in the import authentication information 215. Since the authentication process is identical to the process described above in P3, a description of this process will not be repeated.

When authentication is successful in P9, the MFP 100B allows importation of setting information, and in P10 the MFP 100B decrypts the Backup.bin file using the data password included in the import authentication information 215 to generate the data.json file.

In P11 the MFP 100B copies information from the data.json file to the NVM 104B. This completes the process for importing the import setting information 220 into the MFP 100B.

In P12 the MFP 100B encrypts the import authentication information 215, i.e., the Import.txt file, using the device password and stores the encrypted file in the USB memory 200 as an Import.bin file. The Import.bin file is an encrypted form of the import authentication information 215. The MFP 100B also deletes the Import.txt file from the USB memory 200. Thus, the MFP 100B replaces the Import.txt file with an encrypted version. The Import.bin file is an example of the encrypted import authentication information of the present disclosure.

Next, an export process executed by the MFP 100A, and more particularly by the CPU 101A, will be described in detail with reference to FIGS. 6 and 7. This export process corresponds to P2 through P6 in FIG. 5 described above. In the following description, the term "step" indicating a step in the process is abbreviated as "S".

Figure 6:
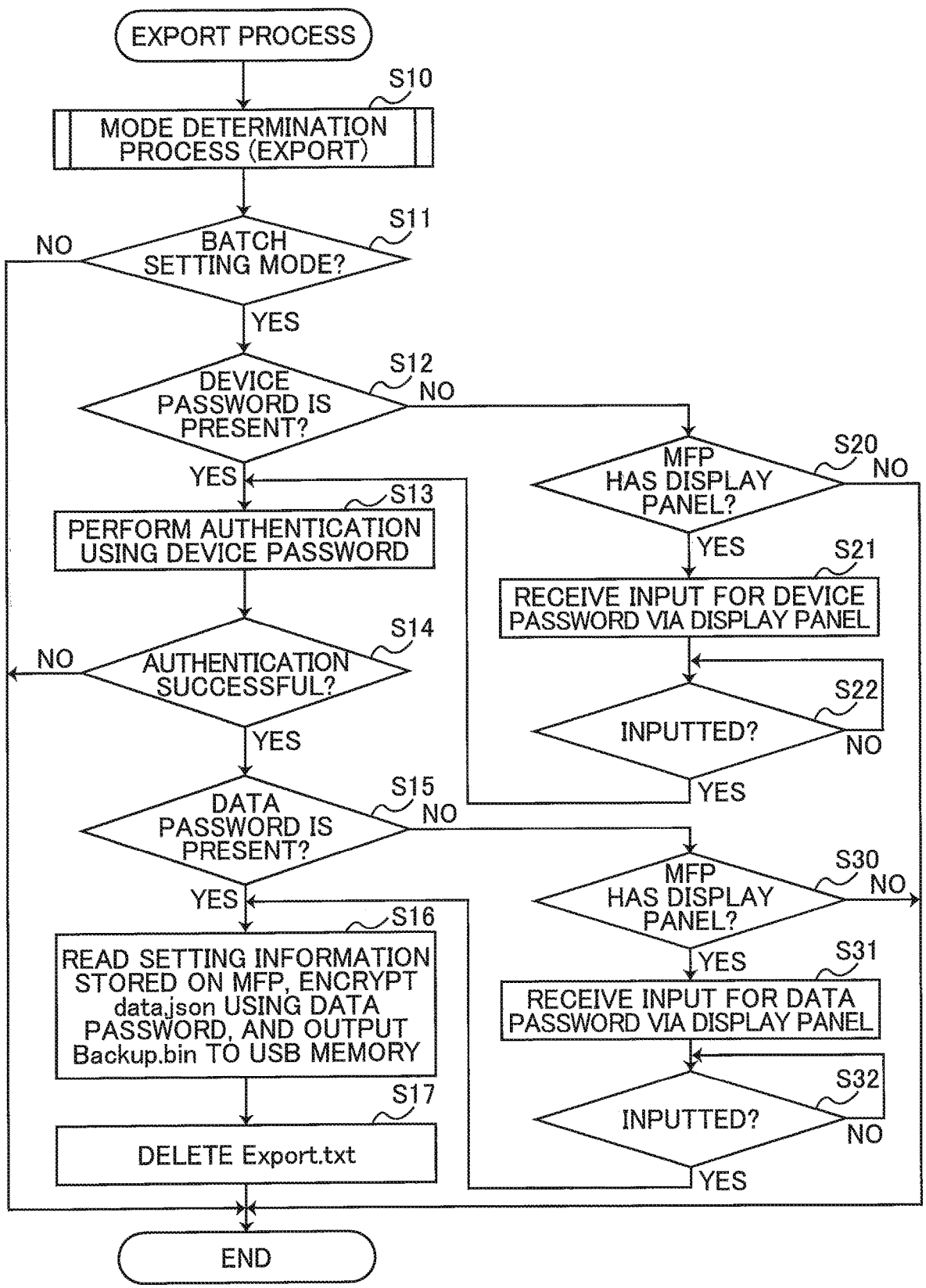
FIG. 6 is a flowchart illustrating steps in an export process executed by a CPU of the multifunction peripheral illustrated in FIG. 1.

In S10 of FIG. 6, the CPU 101A first performs a mode determination process (export). Since the mode determination process is performed in an import process described later (see FIGS. 8 and 10) as well as the export process, "(export)" will be appended to the process name to distinguish when the mode determination process is being executed during the export process.

Figure 7:
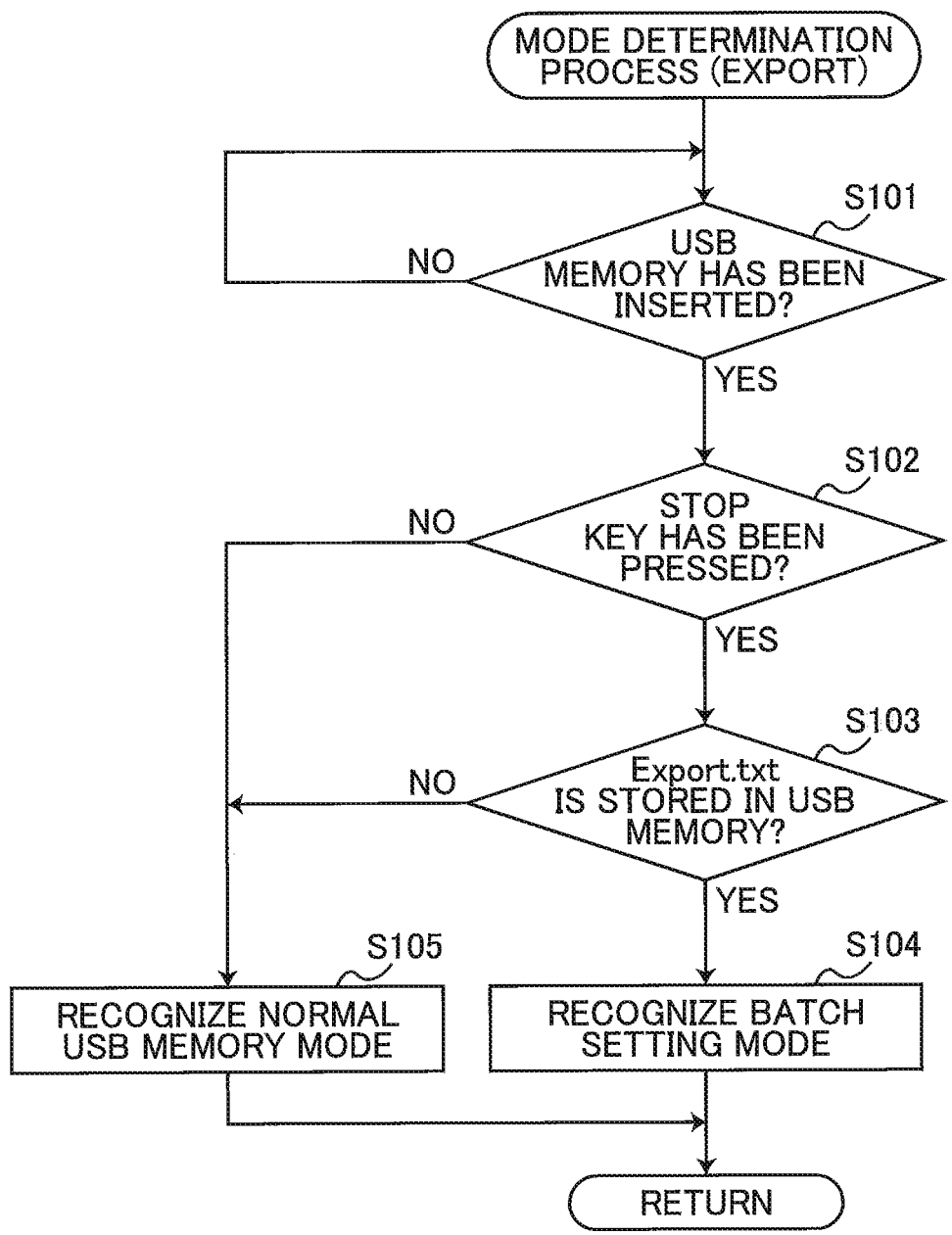
FIG. 7 is a flowchart illustrating steps in a mode determination process included in the export process illustrated in FIG. 6.

FIG. 7 illustrates steps in the mode determination process (export). The mode determination process (export) is performed to determine whether the MFP 100A will operate in the normal USB memory mode or the batch setting mode when the USB memory 200 is inserted into the USB interface 107A of the MFP 100A.

In S101 of FIG. 7, the CPU 101A determines whether the USB memory 200 has been inserted into the USB interface 107A. When the CPU 101A determines the USB memory 200 has been inserted (S101: YES), in S102 the CPU 101A determines whether the Stop key SK has been pressed. Hence, the process in S101 and S102 serves to determine whether the operator has inserted the USB memory 200 while pressing the Stop key SK.

If the CPU 101A determines that the Stop key SK has been pressed (S102: YES), i.e., when the CPU 101A determines that the operator has inserted the USB memory 200 while pressing the Stop key SK, in S103 the CPU 101A determines whether the Export.txt file, i.e., the export authentication information 210, is stored in the USB memory 200. If the CPU 101 determines that the export authentication information 210 is stored in the USB memory 200 (S103: YES), in S104 the CPU 101A recognizes the batch setting mode. The CPU 101A subsequently ends the mode determination process (export) and returns to the export process in FIG. 6.

On the other hand, if the CPU 101A determines in S102 that the Stop key SK has not been pressed (S102: NO) or determines in S103 that the export authentication information 210 is not stored in the USB memory 200 (S103: NO), in S105 the CPU 101A recognizes the normal USB memory mode. The CPU 101A subsequently ends the mode determination process (export) and returns to the export process in FIG. 6.

Note that if the CPU 101A determines in S101 that the USB memory 200 has not been inserted (S101: NO), the CPU 101A continues to wait until the USB memory 200 is inserted.

Returning to FIG. 6, in S11 the CPU 101A determines whether the mode recognized when the USB memory 200 was inserted is the batch setting mode. If the CPU 101A determines that the batch setting mode was not recognized (S11: NO), the CPU 101A ends the export process. However, when the CPU 101A determines that the batch setting mode was recognized (S11: YES), in S12 the CPU 101A determines whether the export authentication information 210 includes a device password. When the batch setting mode is recognized, the export authentication information 210 is present in the USB memory 200 (see S103 described above). However, the export authentication information 210 may not include both a device password and a data password. Accordingly, the CPU 101A determines whether the export authentication information 210 includes a device password in S12.

If the CPU 101A determines that a device password is present in the export authentication information 210 (S12: YES), in S13 the CPU 101A performs an authentication process with the device password. Since this authentication process is the process described above in P3 of FIG. 5, a description of this process will not be repeated here.

However, if the CPU 101A determines in S12 that a device password is not present in the USB memory 200 (S12: NO), in S20 the CPU 101A determines whether the MFP possesses a display panel. Since the MFP 100A is provided with the display panel 105A, as described above, the CPU 101A reaches a YES determination in S20. However, the determination process of S20 is necessary because not every MFP is equipped with a display panel.

If the CPU 101A determines in S20 that the MFP does not have a display panel (S20: NO), the CPU 101A ends the export process.

However, when the CPU 101A determines that the MFP has a display panel (S20: YES), in S21 the CPU 101A receives input for a device password via the display panel 105. In S22 the CPU 101A waits while the device password has not yet been inputted (S22: NO). When the device password is inputted (S22: YES), the CPU 101A advances to S13 described above. A description of the process in S13 will not be repeated here.

Thus, in the present embodiment, it is assumed that input for a device password can be received when a device password is not included in the export authentication information 210 and when the MFP has a structure on which the operator can input a device password (the display panel 105 in the present embodiment).

In S14 the CPU 101A determines whether authentication was successful in the authentication process of S13. If the CPU 101A determines that authentication failed (S14: NO), the CPU 101A ends the export process. However, if the CPU 101A determines that authentication was successful (S14: YES), in S15 the CPU 101A determines whether a data password is included in the export authentication information 210.

When the CPU 101A determines that a data password is present in the export authentication information 210 (S15: YES), in S16 the CPU 101A reads the setting information stored on its own MFP (i.e., setting information stored in the NVM 104A), generates a data.json file, encrypts the data.json file using the data password to generate a Backup.bin file, and outputs this Backup.bin file via the USB interface 107A. Through this process, a Backup.bin file, which holds the encrypted import setting information 225, is stored in the USB memory 200. As in the example described above, the term "export" denotes the action of the CPU 101 storing data related to setting information (Backup.bin, for example) in the USB memory 200.

In the process of S16, the data.json file is encrypted using the data password, but encryption may be performed using the device password when no data password is present. In such a case, the operator may first be prompted to indicate whether to encrypt the file using the device password.

In S17 the CPU 101A deletes the Export.txt file (i.e., the export authentication information 210) from the USB memory 200, and subsequently ends the export process.

On the other hand, if the CPU 101A determines in S15 that a data password is not present in the export authentication information 210 (S15: NO), in S30 the CPU 101A determines whether the MFP has a display panel. The CPU 101A receives input for a data password via the display panel when a display panel exists, and ends the export process when a display panel does not exist. The process in S30-S32 differs from the process in S20-S22 described above only in the type of password. Therefore, a more detailed description will not be given here.

Next, a first import process executed by the MFP 100B, and more particularly by the CPU 101B, will be described in detail with reference to FIGS. 8 and 9. The first import process is executed if P7 in FIG. 5 has not been performed and the USB memory 200 is connected to the MFP 100B while import authentication information 215 (see FIG. 3E) is not stored in the USB memory 200. In other words, the first import process is performed to receive via the display panel 105 a device password and data password required for the import process, more specifically, a second import process to be described later.

Figure 8:
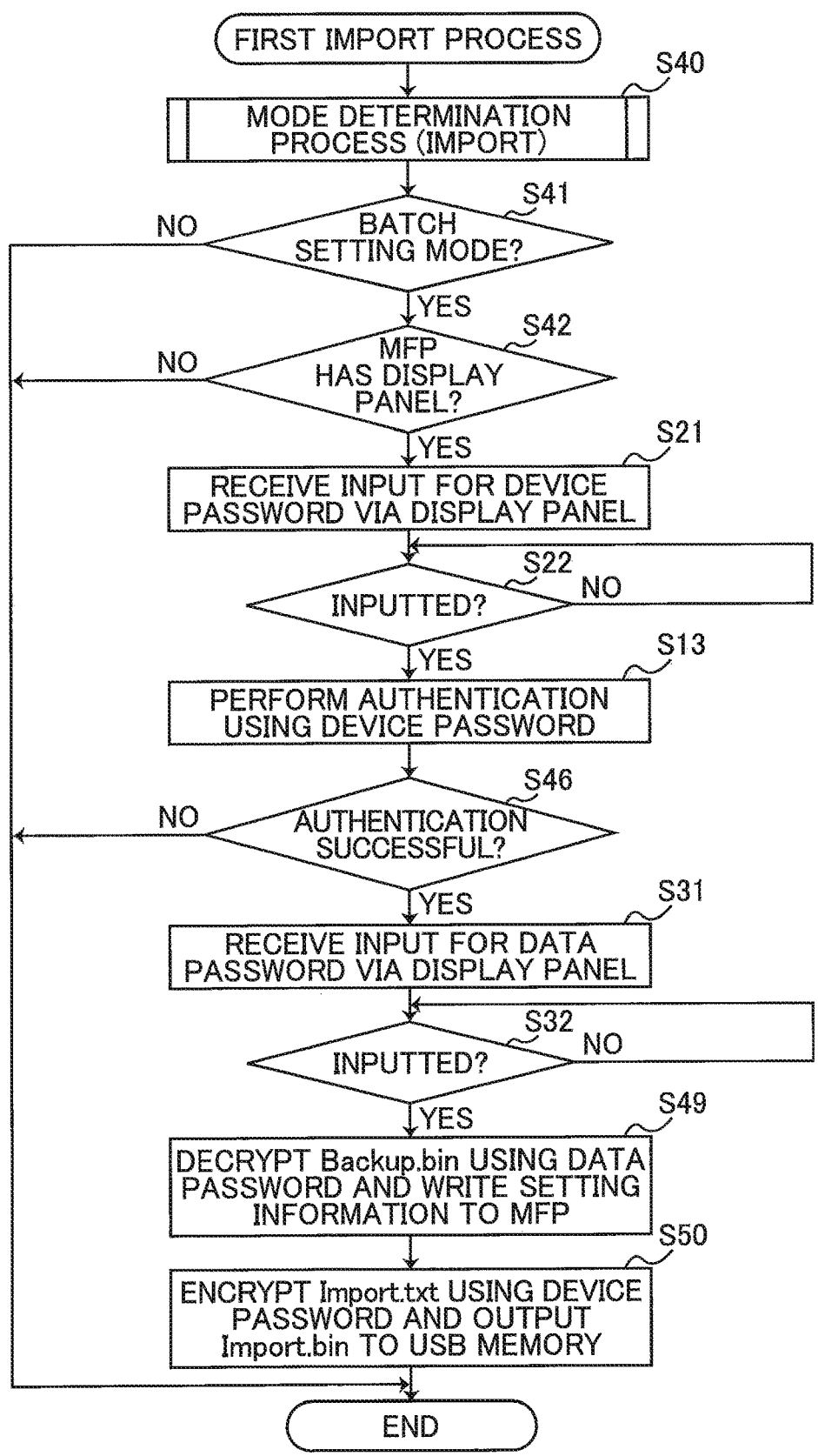
FIG. 8 is a flowchart illustrating steps in a first import process executed by the CPU of the multifunction peripheral illustrated in FIG. 1.

In S40 of FIG. 8, the CPU 101B performs a mode determination process (import).

Figure 9:
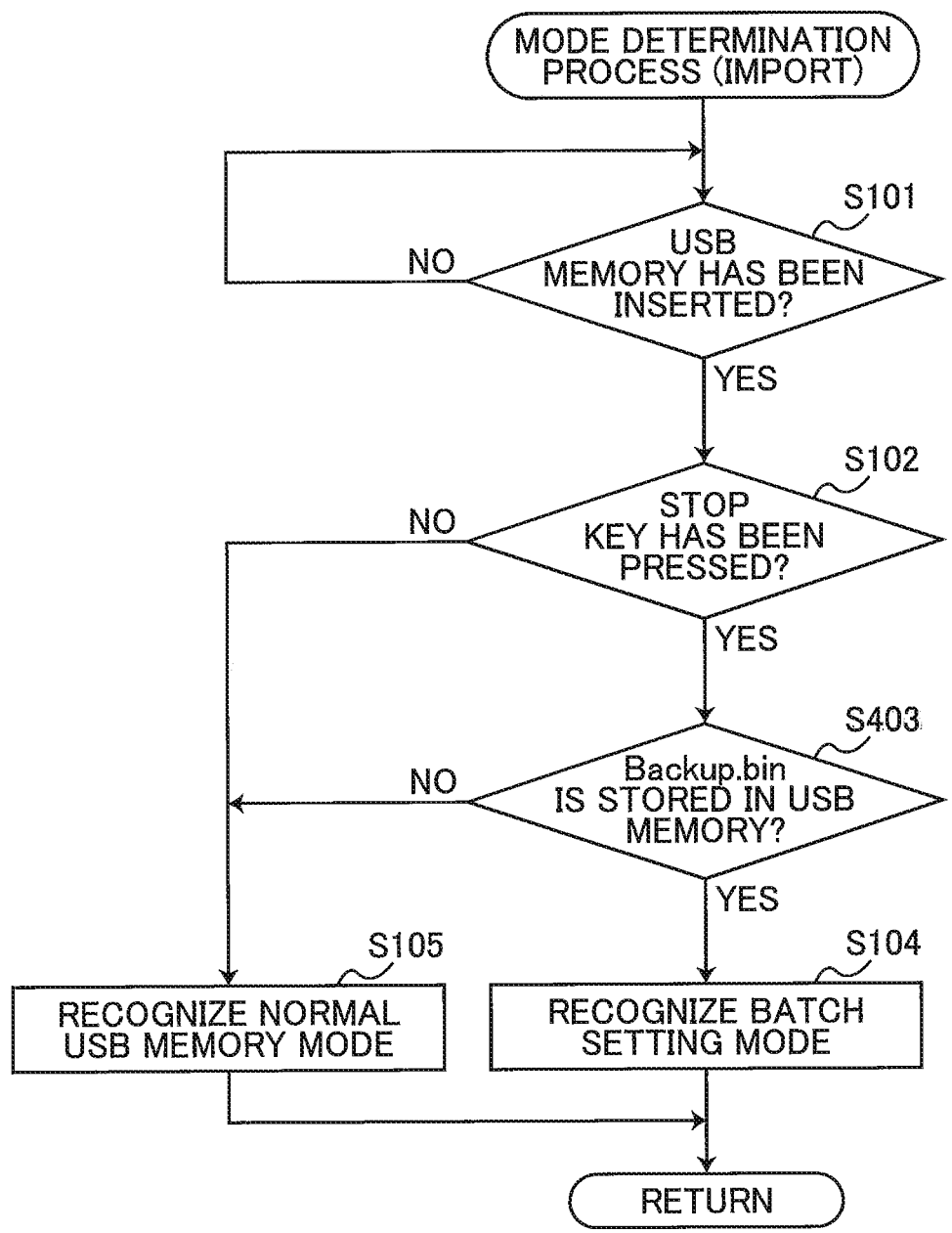
FIG. 9 is a flowchart illustrating steps in a mode determination process included in the first import process illustrated in FIG. 8.

FIG. 9 illustrates steps in the mode determination process (import). The mode determination process (import) is performed to determine whether to recognize the MFP 100B as operating in the normal USB memory mode or the batch setting mode when the USB memory 200 is inserted into the USB interface 107B of the MFP 100B.

Since the mode determination process (import) differs from the mode determination process (export) of FIG. 7 described above only in the determination process of S403, the steps performing similar processes to those in FIG. 7 are designated with the same step numbers, and a description of steps other than S403 will not be included here.

In S403 the CPU 101B determines whether a Backup.bin file is stored in the USB memory 200. The determination process of S403 is included in the mode determination process (import) because without a Backup.bin file stored in the USB memory 200 there is no setting information to import and, hence, the import process cannot be performed.

Returning to FIG. 8, in S41 the CPU 101B determines whether the mode recognized when the USB memory 200 was inserted is the batch setting mode. If the CPU 101B determines that the batch setting mode was not recognized (S41: NO), the CPU 101B ends the first import process. However, when the CPU 101B determines that the batch setting mode was recognized (S41: YES), in S42 the CPU 101B determines whether the MFP possesses a display panel.

If the CPU 101B determines in S42 that the MFP does not have a display panel (S42: NO), the CPU 101B ends the first import process. However, when the CPU 101B determines that the MFP has a display panel (S42: YES), the CPU 101B advances to S43. The process in S21, S22, and S13 of the first import process illustrated in FIG. 8 is identical to the process in S21, S22, and S13 described above in the export process illustrated in FIG. 6. Therefore, a description of this process will not be repeated here.

In S46 the CPU 101B determines whether authentication was successful in the authentication process of S45. If the CPU 101B determines that authentication failed (S46: NO), the CPU 101B ends the first import process. However, if the CPU 101B determines that authentication was successful (S46: YES), the CPU 101B advances to S47. Since the process in S31 and S32 is identical to that in S31 and S32 of the export process described above, a description of this process will not be repeated.

In S49 the CPU 101B decrypts the Backup.bin file using the data password received in S31 to generate the data.json file, and stores (writes) setting information included in the data.json file to the NVM 104B of the MFP 100B. As in the example described above, the term "import" denotes the action of the CPU 101 storing data related to setting information in the NVM 104.

In S50 the CPU 101B generates an Import.txt file that includes the device password received in S21 and the data password received in S31, encrypts the Import.txt file using the device password received in S21 to generate an Import.bin file, and outputs the Import.bin file to the USB memory 200 via the USB interface 107B. Subsequently, the CPU 101 ends the first import process. Thus, through the first import process, an Import.bin file is stored in the USB memory 200. In the next import process, this Import.bin file can be used as the encrypted import authentication information 215.

Next, a second import process executed by the MFP 100B, and more particularly by the CPU 101B, will be described in detail with reference to FIGS. 10 and 11. The second import process corresponds to P8 through P12 in FIG. 5 described above.

As described above, the first import process is performed to import setting information into the MFP 100B when an Import.txt file (i.e., import authentication information 215) is not stored in the USB memory 200. In contrast, the second import process is performed to import setting information into the MFP 100B when import authentication information 215, and specifically an Import.txt file or an Import.bin file, is stored in the USB memory 200. In FIGS. 10 and 11, steps performing similar processes to those in FIGS. 8 and 9 are designated with the same step numbers to avoid duplicating description.

Figure 10:
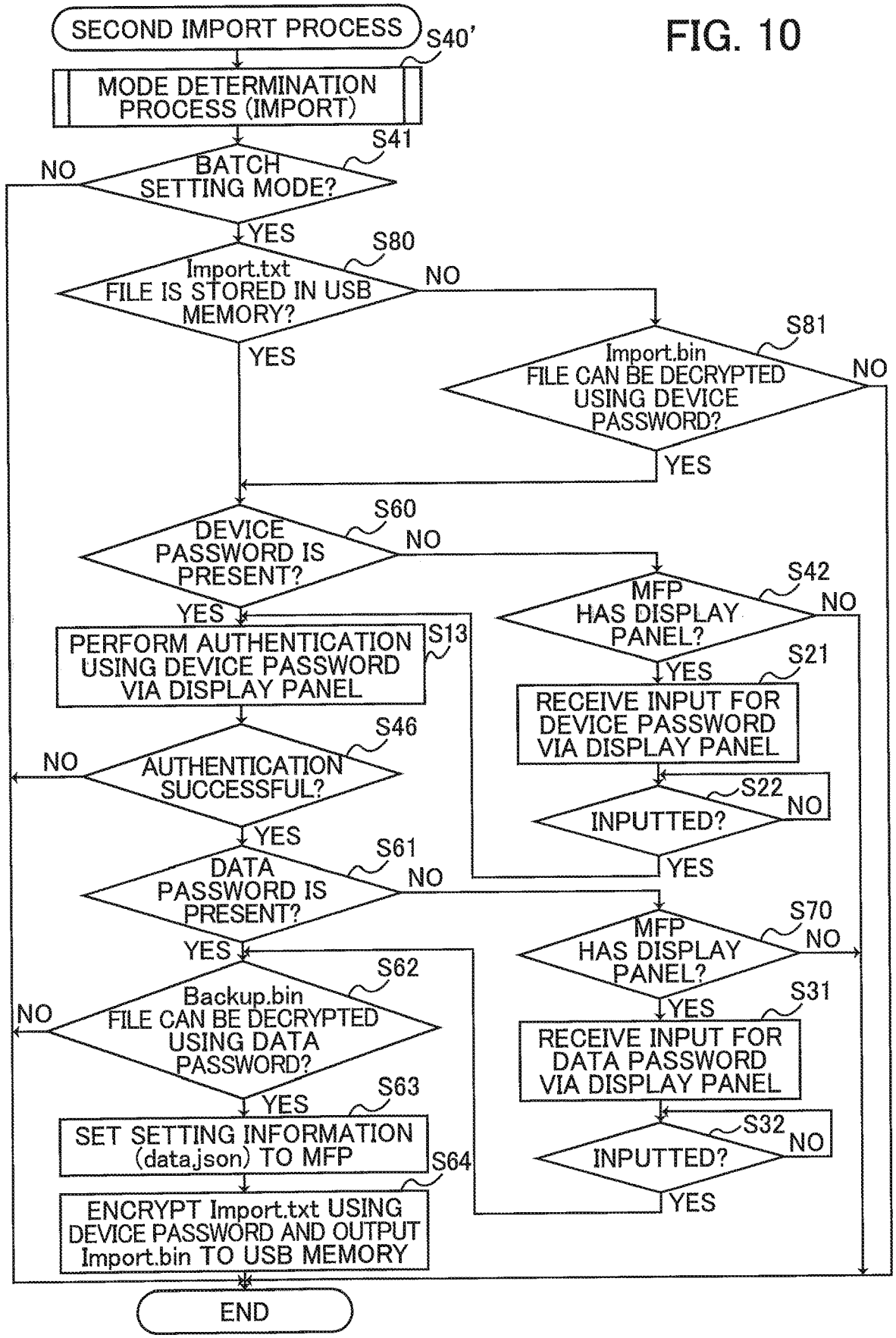
FIG. 10 is a flowchart illustrating steps in a second import process executed by the CPU of the multifunction peripheral illustrated in FIG. 1.

In S40' of FIG. 10, the CPU 101B performs a mode determination process (import).

Figure 11:
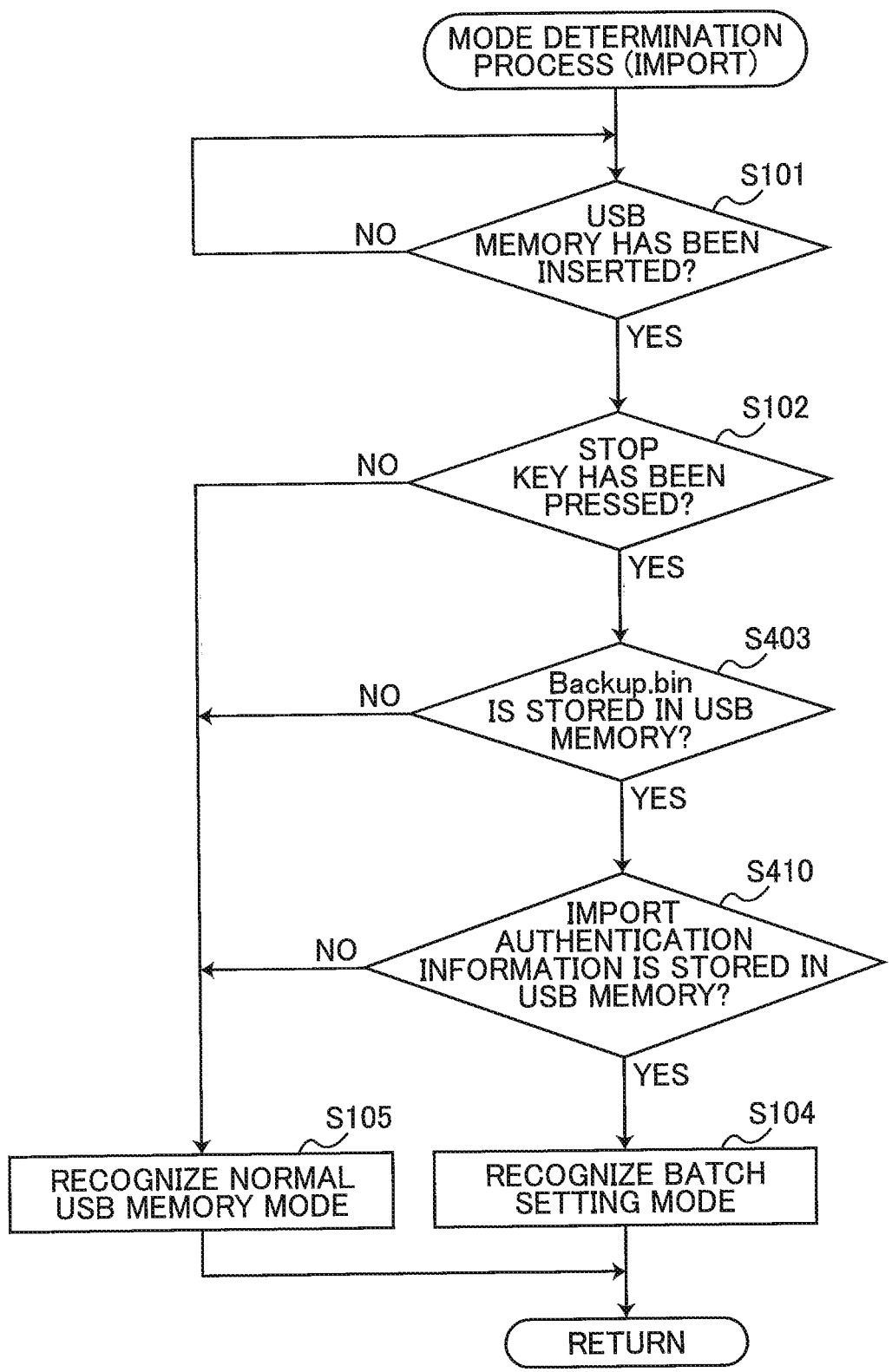
FIG. 11 is a flowchart illustrating steps in a mode determination process included in the second import process illustrated in FIG. 10.

FIG. 11 illustrates steps in the mode determination process (import). The mode determination process (import) is identical to the mode determination process (import) in FIG. 9, but with the addition of the determination process in S410. That is, the CPU 101B does not recognize the batch setting mode when import authentication information 215 (i.e., an Import.txt file or an Import.bin file) is not stored in the USB memory 200 (S410: NO).

Returning to FIG. 10, in S80 the CPU 101B determines whether an Import.txt file is present in the USB memory 200. If an Import.txt file exists in the USB memory 200 (S80: YES), the CPU 101B recognizes that non-encrypted import authentication information 215 exists and advances to S60. However, if an Import.txt file does not exist (S80: NO), the CPU 101B advances to S81. Note that if both an Import.txt file and an Export.txt file exist in the USB memory 200, the CPU 101 executes the mode determination process (export).

In S81 the CPU 101B determines whether the Import.bin file can be decrypted using the device password for the MFP 100B. If an Import.txt file can be obtained by decrypting the Import.bin file (S81: YES), the CPU 101B advances to S60. However, if the Import.bin file cannot be decrypted (S81: NO), the CPU 101B ends the second import process. Note that in S81 the Import.txt file is developed in the RAM 103B and is not recorded in the USB memory 200.

In S60 the CPU 101B determines whether the Import.txt file (i.e., the import authentication information 215) includes the device password for the MFP 100B. The CPU 101B advances to S45 when determining that the device password is present in the import authentication information 215 (S60: YES), and advances to S42 when determining that the device password is not present in the import authentication information 215 (S60: NO).

If the CPU 101B determines in S46 that authentication was successful (S46: YES), in S61 the CPU 101 determines whether the import authentication information 215. The CPU 101B advances to S62 when determining that a data password is present in the import authentication information 215 (S61: YES), and advances to S70 when determining that a data password is not present in the import authentication information 215 (S61: NO).

In S62 the CPU 101B determines whether the Backup.bin file can be decrypted using the data password. When a data.json file can be obtained by decrypting the Backup.bin file (S62: YES), in S63 the CPU 101B copies setting information included in the data.json file to the NVM 104B. In S64 the CPU 101B encrypts the Import.txt file (i.e., the import authentication information 215) using the device password, and stores this encrypted file in the USB memory 200 as an Import.bin file. Subsequently, the CPU 101 ends the second import process. The CPU 101 also deletes the Import.txt file from the USB memory 200 in S64. Note that when an Import.bin file has been already stored in the USB memory 200, the CPU 101 skips the process in S64.

On the other hand, if the CPU 101B determines in S62 that the Backup.bin file cannot be decrypted (S62: NO), the CPU 101B ends the second import process.

In S70 the CPU 101B determines whether the MFP has a display panel, as in the process of S30 in FIG. 6 described above. If the MFP has a display panel (S70: YES), the CPU 101 advances to S31. However, if the MFP does not have a display panel (S70: NO), the CPU 101 ends the second import process.

In the present embodiment, the MFP 100 encrypts the import authentication information 215 and stores the encrypted file in the USB memory 200, thereby protecting the import authentication information 215. Hence, the MFP 100 of the present embodiment can take measures to keep this information secure.

Further, since the MFP 100 can execute an import process by decrypting the encrypted import authentication information 215 using the device password for the MFP 100, measures can be taken to make the information more secure when import processes are being performed on a plurality of MFPs 100.

While the description has been made in detail with reference to a specific embodiment, it would be apparent to those skilled in the art that various changes and modifications may be made thereto.

(1) In the embodiment described above, the MFP 100 is described as an example of the information-processing device of the present disclosure. However, the information-processing device is not limited to the MFP 100, but may be a single-function device such as a printer, a scanner, a copier, or the like.

(2) In the embodiment described above, a multifunction peripheral provided with no facsimile function is described as an example of the MFP 100. However, the present disclosure is not limited to this. The MFP 100 may be provided with a facsimile function.

(3) In the embodiment described above, the CPU 101 is provided as an example of the controller of the present disclosure. However, the controller may also be a CPU and a dedicated communication circuit, such as an application specific integrated circuit (ASIC), a field programmable gate array (FPGA), or the like.

(4) In the embodiment described above, the USB interface 107 is provided as an example of the input-output interface of the present disclosure. However, the input-output interface may also be a wireless interface, such as a near-field communication (NFC) interface, a Bluetooth (registered trademark) interface, or the like. Secure Digital Input Output (SDIO) may also be used as the input/output interface. In these cases, the external storage device is also provided with an interface that is compatible with this input/output interface.

(5) In the embodiment described above, encrypted import setting information 225 (a Backup.bin file) is stored in the USB memory 200, and the import setting information 225 is decrypted using the data password in order to import the import setting information 220 (a data.json file) into the MFP 100. However, non-encrypted import setting information 220 may be stored in the USB memory 200 and used when executing the import process.

(6) In the embodiment described above, the MFP 100 is configured to allow the setting information to be exported therefrom or imported thereinto if the MFP 100 acquires the device password while the USB memory 200 is connected to the USB interface 107. However, the present disclosure is not limited to this configuration. The MFP 100 may be configured to allow exportation or importation of the setting information when the MFP 100 acquires the device password and the operator is logged in to the MFP 100 even if the USB memory 200 is not connected to the USB interface 107.

What is claimed is:

1. An information-processing device comprising:
a memory;
a USB interface;
a display panel; and
a controller configured to perform:
(a) determining, in response to a first USB memory storing encrypted first setting information being connected to the USB interface, whether a prescribed condition for importing the encrypted first setting information is met, the encrypted first setting information being first setting information encrypted using a first data password, the first setting information including a first operation setting for the information-processing device;
(b) receiving, in response to determining in (a) that the prescribed condition is met, an input via the display panel;
(c) determining whether the input matches a preset device password for logging into the information-processing device;
(d) acquiring, in response to determining in (c) that the input matches the preset device password, the first data password via the display panel;
(e) importing the first setting information from the first USB memory into the memory, the first setting information being acquired by decrypting the encrypted first setting information using the first data password acquired in (d);
(f) creating first authentication information including the preset device password and the first data password; and
(g) encrypting the first authentication information using the preset device password to create encrypted first authentication information and storing the encrypted first authentication information into the first USB memory in which the encrypted first setting information is stored,
wherein when the first USB memory in which the encrypted first authentication information and the encrypted first setting information are stored is connected to an external device different from the information-processing device, decryption of the encrypted first authentication information is performed using the preset device password by the external device, and when the decryption is successful and the first authentication information is acquired, the first setting information is imported into the external device by decrypting the encrypted first setting information stored in the first USB memory using the first data password included in the first authentication information.

2. The information-processing device according to claim 1, further comprising:
a special key,
wherein the (a) determining determines that the prescribed condition is met in a case where the first USB memory is connected to the USB interface while the special key is being operated.

3. The information-processing device according to claim 1, wherein the controller is configured to further perform:
(h) acquiring, in response to a second USB memory storing second authentication information being connected to the USB interface, the second authentication information from the second USB memory, the second authentication information including a second device password;
(i) determining whether the second device password included in the second authentication information acquired in (h) matches the preset device password; and
(k) exporting, in response to determining in (i) that the second device password matches the preset device password, the first setting information from the memory into the second USB memory.

4. The information-processing device according to claim 3, wherein the second authentication information further includes a second data password,
wherein the controller is configured to further perform:
(k) encrypting the first setting information using the second data password to create encrypted first setting information, and wherein the (j) exporting stores the encrypted first setting information encrypted in (k) in the second USB memory after the (k) encrypting is performed.

5. The information-processing device according to claim 3, wherein the second authentication information further includes a second data password, and wherein the controller is configured to further perform:
(l) deleting the second authentication information from the second USB memory after the (h) acquiring is performed.

6. The information-processing device according to claim 3, wherein the controller is configured to further perform:
(m) determining, in response to a third USB memory storing encrypted second setting information and encrypted third authentication information being connected to the USB interface, whether the encrypted third authentication information can be decrypted using the preset device password, the encrypted third setting information being third setting information encrypted using a third data password, the second setting information including a second operation setting for the information-processing device, the encrypted third authentication information being third authentication information encrypted using a third device password, the third authentication information including the third device password and the third data password;
(n) acquiring, in response to determining in (m) that the encrypted third authentication information can be decrypted, the third data password included in the third authentication information decrypted in (m); and
(o) importing the second setting information from the third USB memory into the memory, the second setting information being acquired by decrypting the encrypted second setting information using the third data password acquired in (n).

7. The information-processing device according to claim 6, further comprising:
a printer,
wherein each of the first setting information and the second setting information includes a print setting for the printer.

8. The information-processing device according to claim 6, further comprising:
a network interface,
wherein each of the first setting information and the second setting information includes an IP address of the information-processing device or an IP address of an external device to which the information-processing device is connected.

9. An information-processing device comprising:
a memory;
a USB interface; and
a controller operable according to setting information, the controller being configured to perform:
(a) determining, in response to a first USB memory storing encrypted first setting information being connected to the USB interface, whether a prescribed condition for importing the encrypted first setting information is met and whether first authentication information including a first device password and a first data password is stored in the first USB memory, the encrypted first setting information being first setting information encrypted using the first data password, the first device password being used for logging into the information-processing device;
(b) determining, in response to determining in (a) that the prescribed condition is met and the first authentication information is stored in the first USB memory, whether the first device password included in the first authentication information matches a preset device password;
(c) acquiring, in response to determining in (b) that the first device password matches the preset device password, the first data password included in the first authentication information from the first USB memory;
(d) importing the first setting information from the USB memory into the memory, the first setting information being acquired by decrypting the encrypted first setting information using the first data password acquired in (c);
(e) creating second authentication information including the preset device password and the first data password; and
(f) encrypting the second authentication information using the preset device password to create encrypted second authentication information and storing the encrypted second authentication information into the USB memory in which the encrypted first setting information is stored, wherein when the first USB memory in which the encrypted second authentication information and the encrypted first setting information are stored is connected to an external device different from the information-processing device, decryption of the encrypted second authentication information is performed using the preset device password by the external device, and when the decryption is successful and the second authentication information is acquired, the first setting information is imported into the external device by decrypting the encrypted first setting information stored in the first USB memory using the first data password included in the second authentication information.

10. The information-processing device according to claim 9, wherein the controller is configured to further perform:
(g) deleting from the first USB memory the first data password acquired in (c).

11. The information-processing device according to claim 9, wherein the controller is configured to further perform:
(h) acquiring, in response to a second USB memory storing third authentication information being connected to the USB interface, the third authentication information from the second USB memory, the third authentication information including a second device password;
(i) determining whether the second device password included in the third authentication information acquired in (h) matches the preset device password; and
(j) exporting, in response to determining in (i) that the third device password matches the preset device password, the first setting information from the memory into the second USB memory.

12. The information-processing device according to claim 11, wherein the third authentication information further includes a second data password,
wherein the controller is configured to further perform:
(k) encrypting the first setting information using the second data password to create encrypted first setting information, and
wherein the (j) exporting stores the encrypted first setting information encrypted in (k) in the second USB memory after the (k) encrypting is performed.

13. The information-processing device according to claim 11, wherein the third authentication information further includes a second data password, and
wherein the controller is configured to further perform:
(1) deleting the second authentication information from the second USB memory after the (h) acquiring is performed.

14. The information-processing device according to claim 9, wherein the controller is configured to further perform:
(m) determining, in response to a third USB memory storing encrypted second setting information and encrypted fourth authentication information being connected to the USB interface, whether the encrypted fourth authentication information can be decrypted using the preset device password, the encrypted second setting information being second setting information encrypted using a fourth data password, the encrypted fourth authentication information being fourth authentication information encrypted using a third device password, the fourth authentication information including the third device password and the fourth data password;
(n) acquiring, in response to determining in (m) that the encrypted fourth authentication information can be decrypted, the fourth data password included in the fourth authentication information decrypted in (m); and
(o) importing the second setting information from the third USB memory into the memory, the second setting information being acquired by decrypting the encrypted second setting information using the fourth data password acquired in (n).

15. A method for importing setting information into an information-processing device, the setting information including an operation setting for the information-processing device, the information-processing device including: a memory; a USB interface; and a display panel, the method comprising:
(a) determining, in response to a USB memory storing encrypted setting information being connected to the USB interface, whether a prescribed condition for importing the encrypted setting information is met, the encrypted setting information being the setting information encrypted using a data password;
(b) receiving, in response to determining in (a) that the prescribed condition is met, an input via the display panel;
(c) determining whether the input matches a preset device password for logging into the information-processing device;
(d) acquiring, in response to determining in (c) that the input matches the preset device password, the data password via the display panel;
(e) importing the setting information from the USB memory into the memory, the setting information being acquired by decrypting the encrypted setting information using the data password acquired in (d);
(f) creating authentication information including the preset device password and the data password; and
(g) encrypting the authentication information using the preset device password to create encrypted authentication information and storing the encrypted authentication information into the USB memory in which the encrypted setting information is stored,
wherein when the USB memory in which the encrypted authentication information and the encrypted setting information are stored is connected to an external device different from the information-processing device, decryption of the encrypted authentication information is performed using the preset device password by the external device, and when the decryption is successful and the authentication information is acquired, the setting information is imported into the external device by decrypting the encrypted setting information stored in the USB memory using the data password included in the authentication information.

* * * * *